(12) United States Patent
Oddie

(10) Patent No.: US 8,205,509 B2
(45) Date of Patent: Jun. 26, 2012

(54) ROTATING FLOW METER USING PASSIVE NON-PERMANENT MAGNET MARKERS

(75) Inventor: Gary Oddie, St. Neots (GB)

(73) Assignee: Shlumberger Technology Corporation, Sugar Land, TX (US)

( * ) Notice: Subject to any disclaimer, the term of this patent is extended or adjusted under 35 U.S.C. 154(b) by 315 days.

(21) Appl. No.: 12/610,402

(22) Filed: Nov. 2, 2009

(65) Prior Publication Data

US 2010/0154530 A1    Jun. 24, 2010

(30) Foreign Application Priority Data

Dec. 19, 2008  (GB) .................................. 0823209.2

(51) Int. Cl.
*G01F 1/28* (2006.01)
*G01F 15/06* (2006.01)
*E21B 47/10* (2012.01)

(52) U.S. Cl. ............... 73/861.75; 73/861.78; 73/152.18; 73/152.29

(58) Field of Classification Search .......................... None
See application file for complete search history.

(56) References Cited

U.S. PATENT DOCUMENTS

| | | | | |
|---|---|---|---|---|
| 4,088,022 A | * | 5/1978 | Kalotay | 73/861.78 |
| 4,186,603 A | * | 2/1980 | Du Bae | 73/861.81 |
| 4,700,579 A | * | 10/1987 | Hall | 73/861.78 |
| 5,046,370 A | * | 9/1991 | Hall | 73/861.89 |
| 5,727,933 A | * | 3/1998 | Laskaris et al. | 73/861.77 |
| 6,439,062 B2 | * | 8/2002 | Stark et al. | 73/861.77 |
| 6,752,026 B1 | * | 6/2004 | Hyde | 73/861.15 |
| 7,600,419 B2 | | 10/2009 | Oddie | |
| 2008/0236839 A1 | | 10/2008 | Oddie | |

FOREIGN PATENT DOCUMENTS

| | | |
|---|---|---|
| GB | 1539760 | 1/1979 |
| GB | 2135060 A | 8/1984 |
| GB | 2186979 A | 8/1987 |
| GB | 2448018 A | 10/2008 |

OTHER PUBLICATIONS

Combined Search and Exam Report of GB Application Serial No. 0823209.2 mailed Feb. 24, 2009 (Completed Feb. 19, 2009).

* cited by examiner

*Primary Examiner* — Harshad Patel

(57) ABSTRACT

A flow meter for measuring the velocity of surrounding fluid, comprising a rotatable member rotatably coupled to a shaft member, wherein the shaft member comprises a measuring electrical circuit comprising an AC power supply and a primary coil, the rotatable member comprising a passive non-permanent magnet marker responsive to a magnetic field, the arrangement being such that when the circuit is powered by the AC supply the coil generates a magnetic field and the marker is positioned on the rotatable member such that rotation of the rotatable member in response to fluid drag on the member causes the distance between the marker and the coil to oscillate, the marker interacting with the magnetic field at its closest approach to the coil, thereby to cause a measurable electrical response in the circuit. Thus, the speed of rotation of the rotatable member can be determined by measuring an electrical response in the circuit without physically contacting the rotatable member and without involving a permanent magnet is provided.

9 Claims, 2 Drawing Sheets

ROTATING FLOW METER USING PASSIVE NON-PERMANENT MAGNET MARKERS

TECHNICAL FIELD

The invention relates to flow meters for measuring the velocity of surrounding fluid, particularly flow meters used in an oilfield wellbore.

BACKGROUND

Accurate measurement of fluid flow rates in an environment are highly desirable in a wide variety of situations. The type and nature of available flow meters vary considerably and the choice of a particular flow meter will depend strongly on the intended application.

One type of flow meter is based on measuring the rotational velocity of a rotatable member when placed in the fluid to be measured. The passing fluid exerts a drag force onto fins or blades of the rotatable member, which rotates in response in a known manner.

A convenient and widely used method to measure the rotational velocity of the rotating member is to utilise a Hall effect sensor, involving locating a permanent magnet on the rotatable member. As the member rotates, the distance between the magnet and a circuit oscillates, producing a measurable effect with a frequency equal to that of the oscillation. This method is highly favoured because it does not require physical contact with the rotating member, giving a more accurate reading.

When operating an oilfield wellbore, whether during drilling or during production, accurate measurements of fluid flow rates is of great importance. In a recent development, devices which employ Hall effect sensors on a rotating flow meter have been successfully used in the field, giving accurate flow readings in the harsh environment of an underground wellbore.

SUMMARY

It has now been found that the functioning of Hall effect sensors in harsh environments such as an underground wellbore may deteriorate significantly if the rotatable member is exposed to ferromagnetic particles in the fluid. When measuring the flow of fluid downhole it is not uncommon for such a rotatable member to encounter large quantities of such material which tends to adhere to the permanent magnet on the rotatable member. This interferes with the measured flow rate and sufficient build-up of particles can prevent the rotatable member from rotating at all, rendering it useless.

Accordingly, the present invention relates to a flow meter for measuring the velocity of surrounding fluid, comprising a rotatable member rotatably coupled to a shaft member, wherein the shaft member comprises a measuring electrical circuit comprising an AC power supply and a primary coil, the rotatable member comprising a passive non-permanent magnet marker responsive to a magnetic field, the arrangement being such that when the circuit is powered by the AC supply the coil generates a magnetic field and the marker is positioned on the rotatable member such that rotation of the rotatable member in response to fluid drag on the member causes the distance between the marker and the coil to oscillate, the marker interacting with the magnetic field at its closest approach to the coil, thereby to cause a measurable electrical response in the circuit.

Thus, the speed of rotation of the rotatable member can be determined by measuring an electrical response in the circuit without physically contacting the rotatable member and without involving a permanent magnet.

The coil is typically located near to the rotatable member away from the axis of rotation in order that the distance between the coil and marker oscillates. Similarly, the marker is typically located on the rotatable member so that on its closest approach to the coil it enters the magnetic field and leaves the magnetic field at its furthest point, in order to give a clear measurement.

The measurable electrical response may be any of a wide variety of measurable responses, such as a change in voltage.

The marker is passive in the sense that it has no on-board power supply. This is advantageous because it simplifies the design.

The marker can take a wide variety of forms, provided it is responsive to a magnetic field. At its most simplest, the marker could be a non-magnetised ferrous material, such as steel, which will temporarily magnetise when moved into the vicinity of the magnetic field from the coil and induce a measurable response in the circuit.

However, in certain aspects, the marker comprises an electrical circuit, typically comprising a coil, which is termed a secondary coil to distinguish it from the primary coil of the measuring circuit. In this case, the flow meter is arranged so that the primary coil and the secondary coil become aligned at their closest approach. As the secondary coil passes through the magnetic field generated by the primary coil, a small current is induced in the marker circuit which in turn generates a small magnetic field around the secondary coil, establishing an inductive coupling between the two coils. Thus, although the marker is passive, electrical energy can pass to the marker circuit via the inductive coupling.

The marker circuit typically comprises a capacitor and typically also comprises a resistor in addition to the coil. In one simple but effective embodiment, the circuit consists of merely a coil, a capacitor and a resistor. However it may be desirable to include additional electrical components, as desired.

In a preferred arrangement, the marker is an RFID tag comprising a circuit including a chip and an aerial, the aerial constituting the secondary coil. Such an RFID tag will be of the passive variety, in that it has no on-board power supply. In use, the aerial of the RFID tag passes through the magnetic field of the primary coil at the point of closest approach. This induces a small current in the circuit which powers the RFID tag which returns a signal to be read by the measuring circuit, in this case an RFID reader.

In one embodiment, the arrangement is such that the measurable electrical response is asymmetric in order that direction of rotation as well as speed, can be measured. This may be achieved in a wide variety of ways such as varying the density of coil windings having an additional marker or an additional receiver coil, for example.

Typically the rotatable member is freely rotatable in response to local fluid drag and is not independently driven. The rotatable member may comprise a plurality of rotatable blades, angled for response to local fluid drag, resembling an aeroplane propeller. Conveniently the rotatable member comprises a plurality of symmetrically arranged blades fixedly mounted on a hub for rotation in an arrangement commonly referred to in the art as a "spinner".

The flow meter may comprise a single rotatable member or may comprise a plurality of rotatable members, any of which may comprise a passive non-permanent magnet marker according to the invention each with a corresponding measuring circuit on a corresponding shaft portion. Thus, in one arrangement, the flow meter may comprise an array of small rotatable members, each providing a flow reading for their particular region of fluid. In a preferred embodiment the flow meter comprises an array of small rotatable members, radially spaced apart so that when the flow meter is in use, e.g. in a wellbore, each rotatable member can provide a flow measurement specific to their respective location.

The flow meter according to the present invention may be used in a wide variety of applications. However, it is particularly beneficial for flow measurement in an oilfield wellbore which has been drilled. In such an environment it is possible to encounter large concentrations of ferrous materials which can cause problems with known permanent magnet flow meters.

BRIEF DESCRIPTION OF THE DRAWINGS

In the figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The invention will now be illustrated, by way of example, with reference to the following figures, in which.

DESCRIPTION

In the following description, for the purposes of explanation, specific details are set forth in order to provide a thorough understanding of the invention. However, it will be apparent that the invention may be practiced without these specific details.

Figure 1:
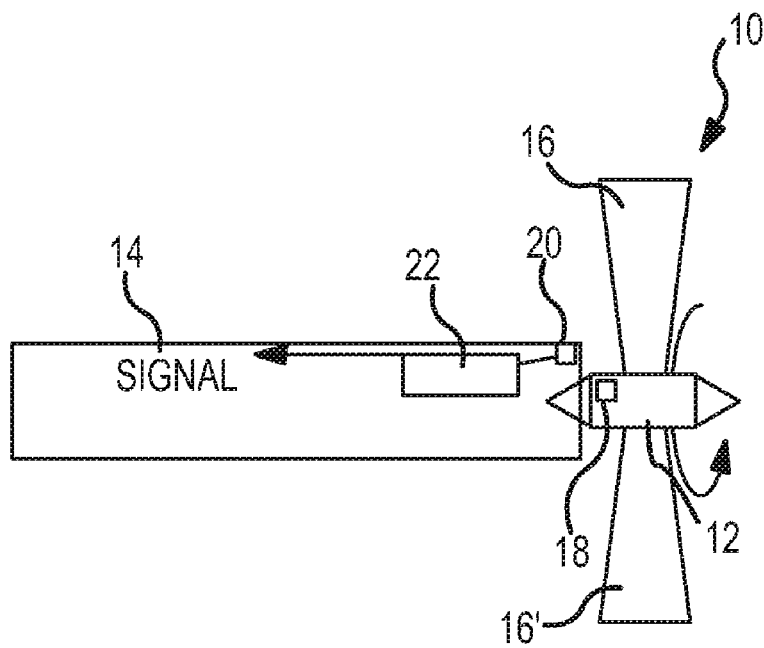
FIG. 1 is a schematic representation of a rotatable member according to the invention mounted on a shaft, wherein the marker is a simple circuit.

Referring to FIG. 1, shown is a spinner 10 comprising a hub 12 and blades 16, 16', which is connected to a shaft 14. Mounted on the hub 12 is a marker circuit 18 comprising a coil and electronic components (not shown), constituting the passive non-permanent magnet marker. Mounted on the shaft 14 is the measuring circuit 20 which is connected to circuitry 22 for processing and measuring readings. As can be seen from the figure, measuring circuit 20 is mounted away from the axis of rotation of the blades 16, 16'.

Circuit 20 is powered by an AC power source (not shown) and when active the coil generates an AC magnetic field. As the blades 16, 16' rotate in response to fluid drag from a surrounding fluid, the distance between marker circuit 18 and measuring circuit 20 oscillates as the marker circuit 18 rotates around the hub 12. As the coil of marker circuit 18 enters the AC magnetic field of measuring circuit 20 an inductive coupling is established which has the effect of altering the electronic properties of measuring circuit 20. This change in properties, e.g. a change in voltage, is measured and sent to processing electronics 22 and then transmitted to the surface as a flow rate signal.

Figure 2:
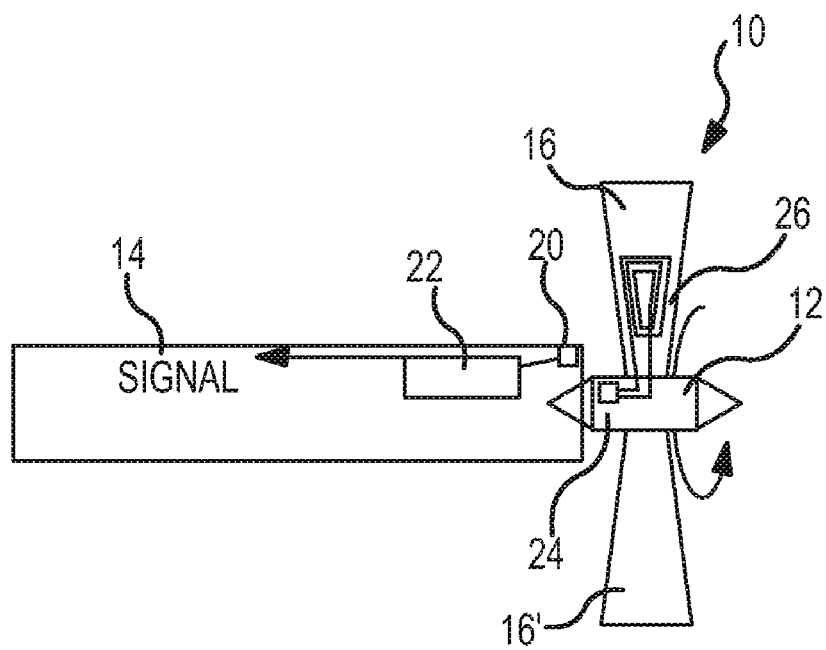
FIG. 2 is a schematic representation of a rotatable member according to the invention mounted on a shaft, whereon the marker is an RFID tag.

FIG. 2 shows a similar arrangement as shown in FIG. 1 and the same reference numbers have been used where the components are the same or similar. In this case, an RFID tag comprising an electric circuit 24 and an aerial 26 is mounted on both hub 12 and blade 16. Other orientations may be possible but this has the benefit of maintaining the position of the aerial for accurate reading. As for FIG. 1, the rotation of blades 16, 16' causes the distance between the RFID aerial 26 and measuring circuit 20 to oscillate which has the effect of the aerial 26 moving into and out of the magnetic field.

Figure 3:
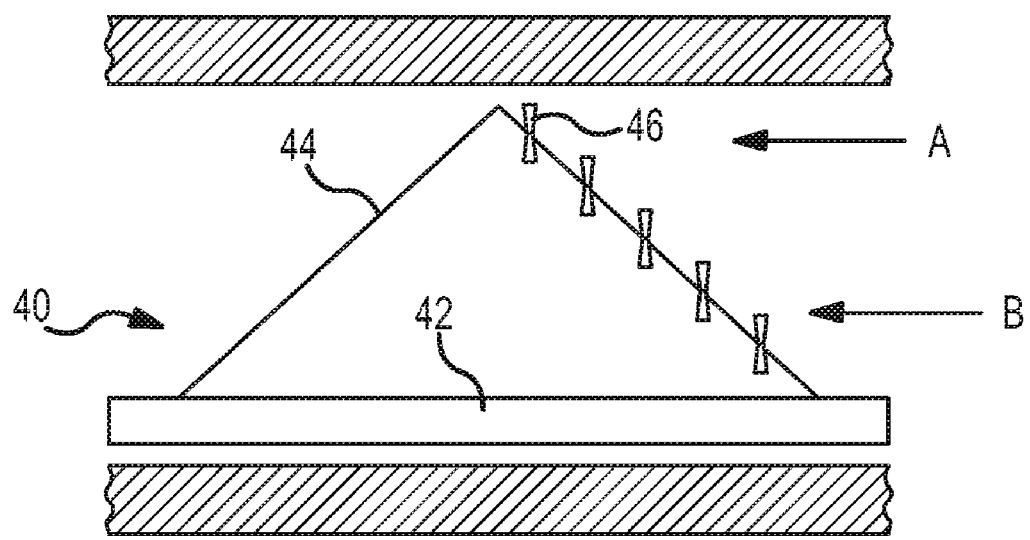
FIG. 3 is a schematic representation of a plurality of rotatable members according to the invention, mounted on an arm of a tool in a wellbore containing flowing fluid.

FIG. 3 shows a flow meter 40 in a wellbore comprising a shaft 42 and a collapsible side arm 44. Rotatably mounted on the side arm are spinners 46, generally as shown in FIG. 1. In use, fluid flows in the direction of arrows A and B travelling with differing fluid velocities. As the spinners 46 are radially spaced apart, the velocities of flows A and B may be separately determined, yielding useful flow velocity information.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims. Although specific embodiments of the invention have been described, various modifications, alterations, alternative constructions, and equivalents are also encompassed within the scope of the invention. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof. For example, the processing performed by the present invention, as described above, may be implemented in hardware chips, graphics boards or accelerators, etc.

The invention claimed is:

1. A flow meter for measuring a velocity of surrounding fluid in a borehole, comprising:
    a shaft member;
    a measuring electrical circuit comprising an alternating-current power supply and a primary coil coupled with the shaft member;
    a rotatable member rotatably coupled to the shaft member; and
    a passive non-permanent magnet marker coupled with the rotatable member and configured in use to interact with a magnetic field produced by the measuring electrical circuit and generate a measurable electrical response in the primary coil when the passive non-permanent magnet marker is rotated past the measuring electrical circuit.

2. A flow meter according to claim 1, wherein the primary coil is located away from the axis of rotation of the rotatable member.

3. A flow meter according to claim 1, wherein the passive non-permanent magnet marker comprises an electrical circuit, comprising a secondary coil.

4. A flow meter according to claim 3, wherein the flow meter is arranged so that the primary coil and the secondary coil are configured such that in use the secondary coil is rotated on the rotatable member past the primary coil establishing an inductive coupling between the two coils.

5. A flow meter according to claim 3, wherein the electrical circuit comprises a capacitor and a resistor.

6. A flow meter according to claim 3, wherein the primary and secondary coils are configured such that the measurable electrical response is asymmetric.

7. A flow meter according to claim 1, wherein the passive non-permanent magnet marker comprises an RFID tag comprising a circuit including a chip and an aerial, the aerial constituting a secondary coil.

8. A flow meter according to claim 7, wherein the primary and secondary coils are configured such that the measurable electrical response is asymmetric.

9. A flow meter according to claim 1, wherein the rotatable member comprises a plurality of rotatable blades, angled for response to local fluid drag.

* * * * *